US 011524879B2

(12) United States Patent
Kohler et al.

(10) Patent No.: US 11,524,879 B2
(45) Date of Patent: Dec. 13, 2022

(54) REMOTE CONTROL SYSTEM FOR A CRANE

(71) Applicant: Oshkosh Corporation, Oshkosh, WI (US)

(72) Inventors: Toni Kohler, Oshkosh, WI (US); Axel Cadena, Oshkosh, WI (US)

(73) Assignee: Oshkosh Corporation, Oshkosh, WI (US)

( * ) Notice: Subject to any disclaimer, the term of this patent is extended or adjusted under 35 U.S.C. 154(b) by 0 days.

(21) Appl. No.: 17/679,618

(22) Filed: Feb. 24, 2022

(65) Prior Publication Data

US 2022/0332549 A1 Oct. 20, 2022

Related U.S. Application Data

(60) Provisional application No. 63/176,681, filed on Apr. 19, 2021.

(51) Int. Cl.
*B66C 13/40* (2006.01)
*G08C 17/02* (2006.01)
*G06F 3/14* (2006.01)

(52) U.S. Cl.
CPC ............. *B66C 13/40* (2013.01); *G06F 3/14* (2013.01); *G08C 17/02* (2013.01); *G08C 2201/30* (2013.01); *G08C 2201/50* (2013.01)

(58) Field of Classification Search
CPC ............ B66C 13/40; G06F 3/14; G08C 17/02
See application file for complete search history.

(56) References Cited

U.S. PATENT DOCUMENTS

| 5,359,542 | A | * | 10/1994 | Pahmeier | B25J 9/1615 |
| | | | | | 356/621 |
| 7,344,109 | B1 | * | 3/2008 | Rezai | B64D 11/00 |
| | | | | | 244/118.6 |
| 9,415,976 | B2 | * | 8/2016 | Hermann | B66C 15/045 |
| 9,505,591 | B2 | * | 11/2016 | Morath | B66C 23/905 |
| 10,532,722 | B1 | * | 1/2020 | Betz | B66F 17/006 |
| 10,787,212 | B2 | * | 9/2020 | Smith | B62D 57/032 |
| 10,961,087 | B2 | * | 3/2021 | Hangoebl | B66C 15/00 |
| 2004/0006930 | A1 | * | 1/2004 | Fahrion | B64F 5/40 |
| | | | | | 182/115 |
| 2005/0258122 | A1 | * | 11/2005 | Morath | B66C 23/825 |
| | | | | | 212/294 |
| 2007/0289931 | A1 | * | 12/2007 | Henriksson | B66C 13/46 |
| | | | | | 212/274 |
| 2008/0110844 | A1 | * | 5/2008 | Lewis | B66C 13/48 |
| | | | | | 212/270 |

(Continued)

OTHER PUBLICATIONS

Summit Truck Equipment, "Reach for the Peak Advanced Safety Electronics" brochure, 2019, 2 pages.

*Primary Examiner* — Hussein Elchanti
(74) *Attorney, Agent, or Firm* — Foley & Lardner LLP

(57) ABSTRACT

A handheld remote control for a crane includes a wireless transceiver, an input device, a display screen, and processing circuitry. The wireless transceiver is configured to wirelessly communicate with a controller of the crane. The input device is configured to receive a user input. The display screen is configured to display information regarding deployment of a stabilizer of the crane. The processing circuitry is configured to obtain the user input via the input device, and cause at least one stabilizer of the crane to deploy or retract based on the user input.

20 Claims, 8 Drawing Sheets

(56) References Cited

U.S. PATENT DOCUMENTS

| | | | | |
|---|---|---|---|---|
| 2009/0030647 A1* | 1/2009 | Stocker | G01B 11/03 | |
| | | | 702/152 | |
| 2009/0164345 A1* | 6/2009 | Pierce | G05B 15/02 | |
| | | | 705/29 | |
| 2010/0145526 A1* | 6/2010 | Yamaguchi | G05B 15/02 | |
| | | | 700/275 | |
| 2010/0181165 A1* | 7/2010 | Finn | B23K 37/0235 | |
| | | | 198/339.1 | |
| 2011/0061336 A1* | 3/2011 | Thomas | B66C 23/342 | |
| | | | 52/745.19 | |
| 2011/0076130 A1* | 3/2011 | Stocker | B66C 15/045 | |
| | | | 414/815 | |
| 2011/0231169 A1* | 9/2011 | Furem | E02F 9/2054 | |
| | | | 703/2 | |
| 2012/0101694 A1* | 4/2012 | Morath | B66C 23/905 | |
| | | | 701/1 | |
| 2012/0128113 A1* | 5/2012 | Park | G21C 19/19 | |
| | | | 376/264 | |
| 2013/0013144 A1* | 1/2013 | Tanizumi | B66C 23/905 | |
| | | | 701/34.4 | |
| 2015/0144582 A1* | 5/2015 | Ford | B66C 13/46 | |
| | | | 212/276 | |
| 2016/0201408 A1* | 7/2016 | Little | E21B 19/14 | |
| | | | 414/730 | |
| 2016/0227663 A1* | 8/2016 | Holmes | G06F 1/1637 | |
| 2016/0244268 A1* | 8/2016 | Ritter | B65G 41/008 | |
| 2019/0084808 A1* | 3/2019 | Hartmann | B66C 15/045 | |
| 2020/0391980 A1* | 12/2020 | Hayashi | G05D 3/20 | |
| 2021/0188221 A1* | 6/2021 | Näslund | B66C 13/40 | |
| 2022/0098011 A1* | 3/2022 | Alamome | B66C 23/62 | |

* cited by examiner

US 11,524,879 B2

REMOTE CONTROL SYSTEM FOR A CRANE

CROSS-REFERENCE TO RELATED PATENT APPLICATION

This application claims the benefit of and priority to U.S. Provisional Application No. 63/176,681, filed Apr. 19, 2021, the entire disclosure of which is incorporated by reference herein.

BACKGROUND

The present disclosure generally relates to cranes. More specifically, the present disclosure relates to control systems for cranes.

SUMMARY

One embodiment of the present disclosure is a handheld remote control for a crane. The remote control includes a wireless transceiver, an input device, a display screen, and processing circuitry. The wireless transceiver is configured to wirelessly communicate with a controller of the crane. The input device is configured to receive a user input. The display screen is configured to display information regarding deployment of a stabilizer of the crane. The processing circuitry is configured to obtain the user input via the input device, and cause at least one stabilizer of the crane to deploy or retract based on the user input.

Another embodiment of the present disclosure is a control system for a crane. The control system includes a controller, and a remote control. The controller is configured to operate a stabilizer and an actuator of the crane. The remote control includes at least one joystick configured to receive a user input. The remote control is configured to wirelessly communicate with the controller to transmit the user input to the controller. The user input can be a command to perform leveling of the crane. The controller is configured to use the user input to generate control signals for the stabilizer of the crane to adjust an orientation of the crane to level the crane on a ground surface.

Another embodiment a method for remotely adjusting an orientation of a crane. The method includes obtaining a user input to adjust an orientation of the crane at a remote control. The remote control is configured to wirelessly communicate with a controller on the crane and configured to be held in an operator's hand. The method includes operating a stabilizer of the crane with the controller on the crane in response to the user input to adjust the orientation of the crane. The method also includes displaying data related to the orientation of the crane on a display screen of the remote control as the controller on the crane operates the stabilizer of the crane to adjust the orientation of the crane.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

BRIEF DESCRIPTION OF THE DRAWINGS

The disclosure will become more fully understood from the following detailed description, taken in conjunction with the accompanying FIGURES, wherein like reference numerals refer to like elements, in which.

DETAILED DESCRIPTION

Before turning to the FIGURES, which illustrate the exemplary embodiments in detail, it should be understood that the present disclosure is not limited to the details or methodology set forth in the description or illustrated in the FIGURES. It should also be understood that the terminology used herein is for the purpose of description only and should not be regarded as limiting.

Overview

Referring generally to the FIGURES, a remote control system for a crane includes a remote control having a wireless transceiver for communicating wirelessly with the crane. The crane may include a controller that is configured to operate various stabilizers, winches, compressors, pumps, engines, actuators, hydraulic cylinders, systems, sub-systems, etc., of the crane. The controller may communicate wirelessly with the remote control. The remote control can include a display screen that is configured to provide different screens to an operator. The remote control can be a handheld device that may communicate with the crane even when the operator holds the remote control a distance away from the crane. The operator can use the remote control to provide user inputs which are wirelessly transmitted to the crane and used by the controller of the crane to perform corresponding operations. Advantageously, the remote control facilitates wireless control of the crane and may reduce a number of trips that the operator makes back to the crane, allowing the operator to control the crane remotely.

System

Figure 1:
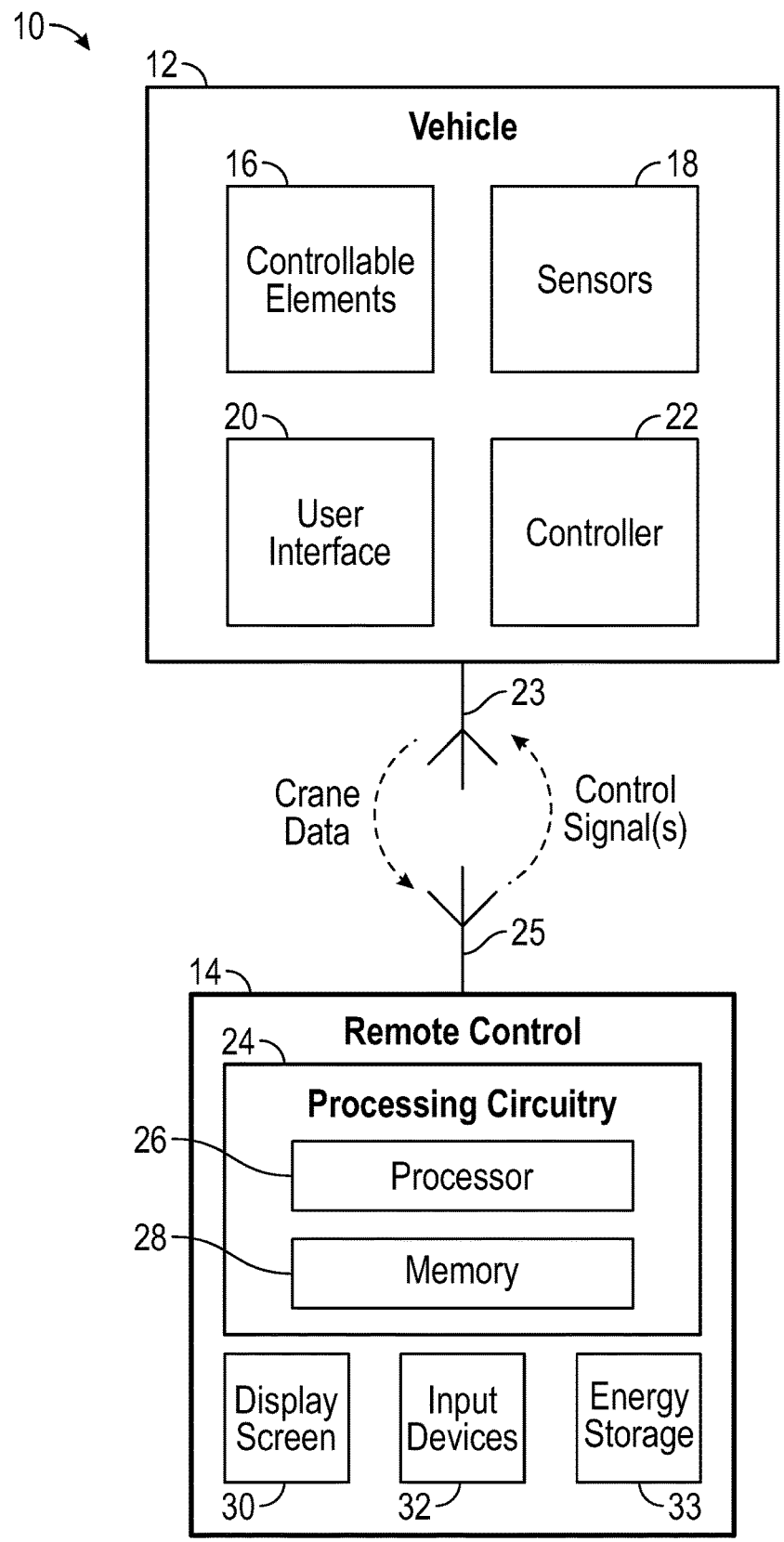
FIG. 1 is a block diagram of a system including a crane communicating with a remote control, according to an exemplary embodiment.
Figure 2:
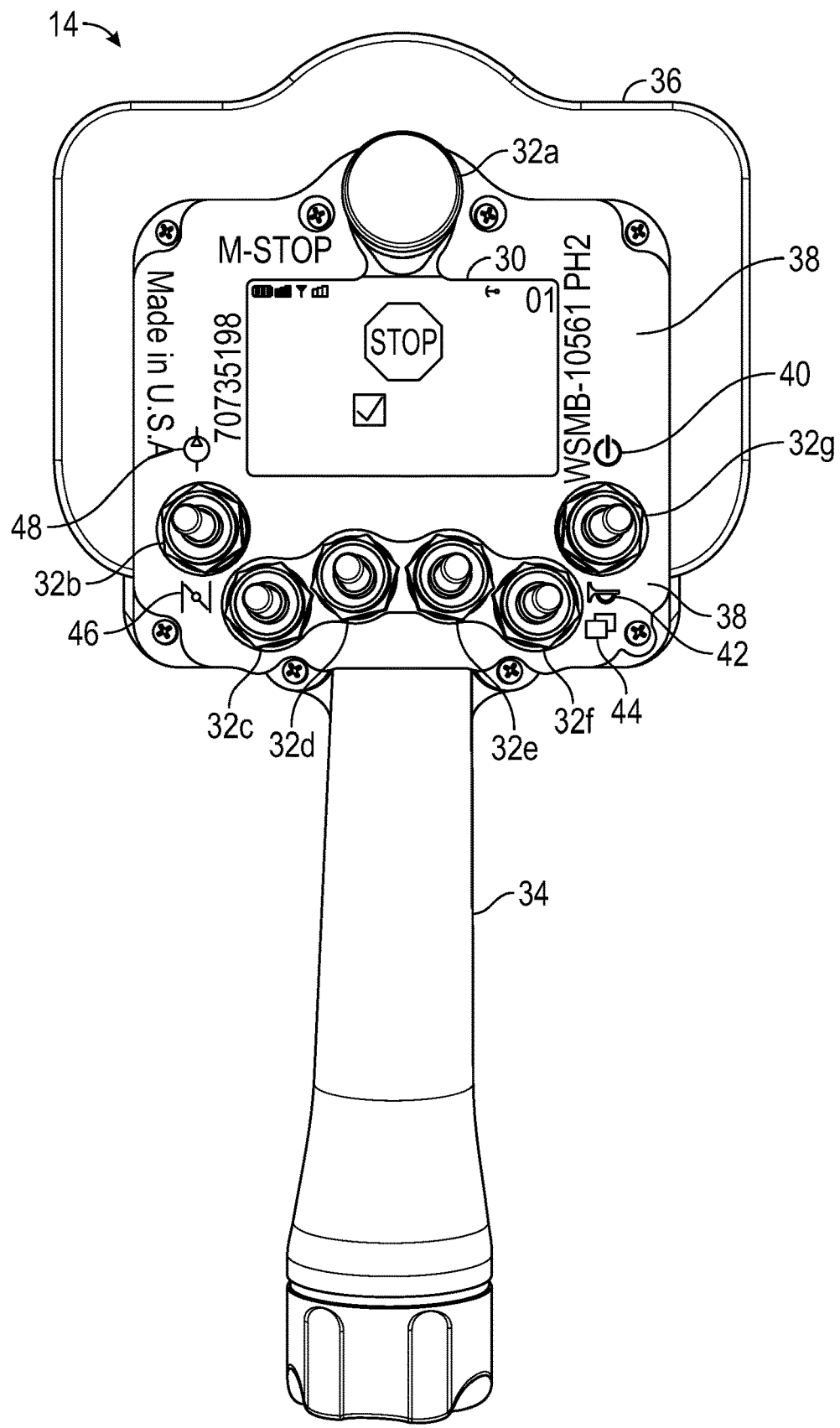
FIG. 2 is a front view of the remote control of FIG. 1, according to an exemplary embodiment.
Figures 3, 4:
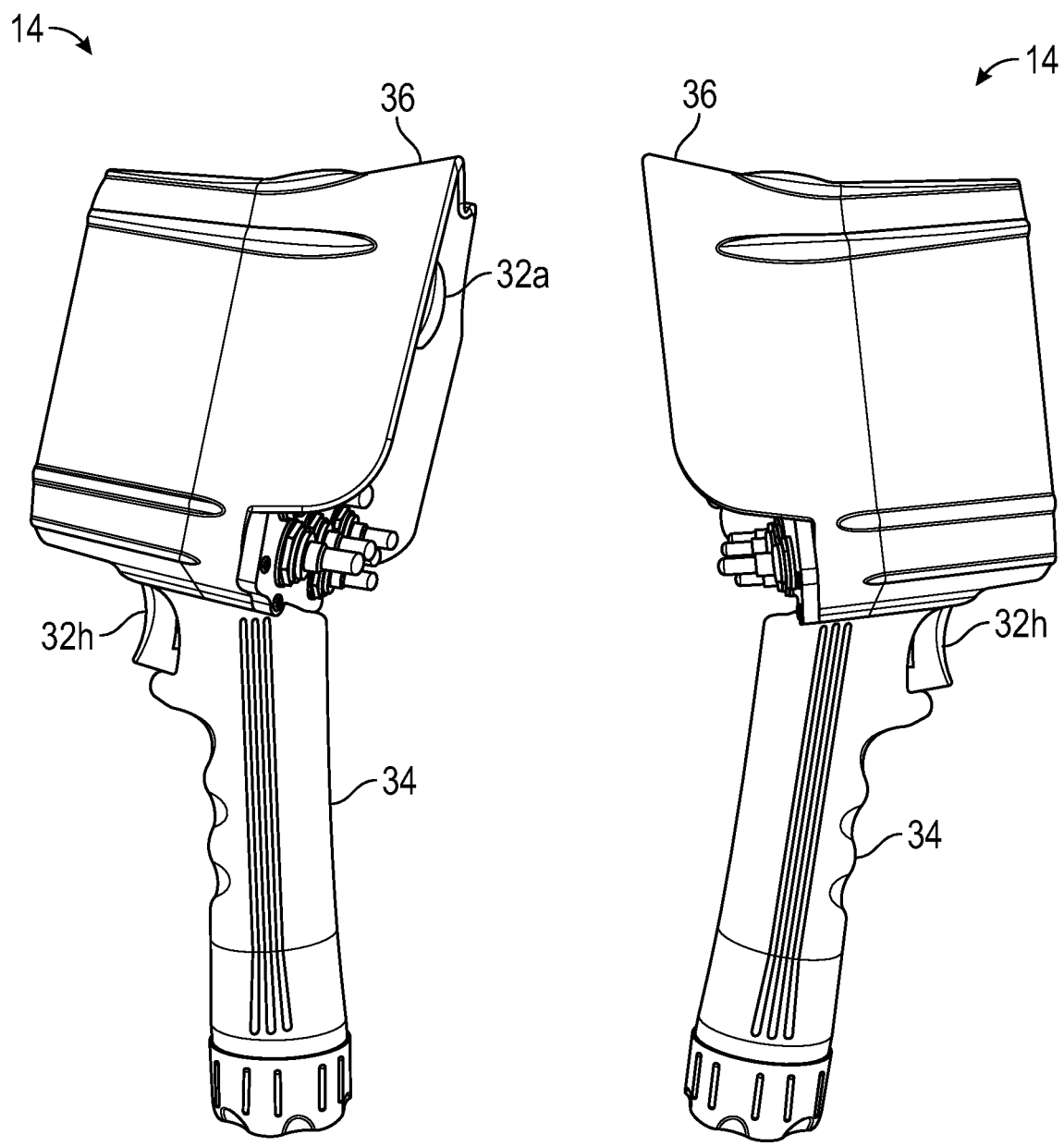
FIGS. 3-4 are side views of the remote control of FIG. 1, according to an exemplary embodiment.
Figure 5:
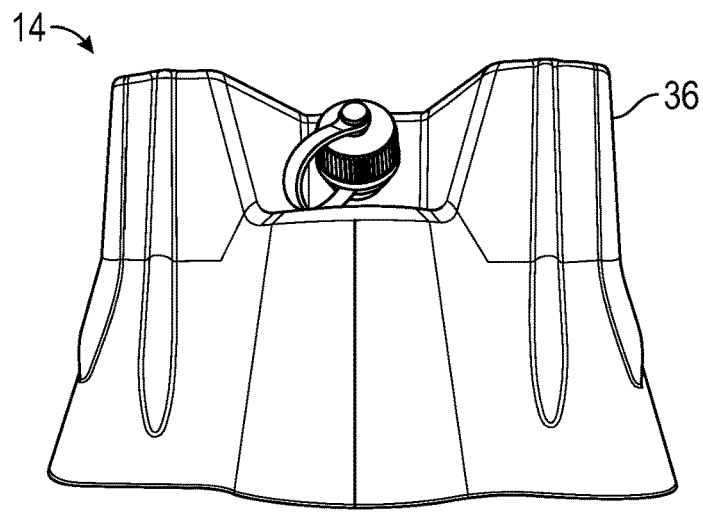
FIG. 5 is a top view of the remote control of FIG. 1, according to an exemplary embodiment.
Figure 6:
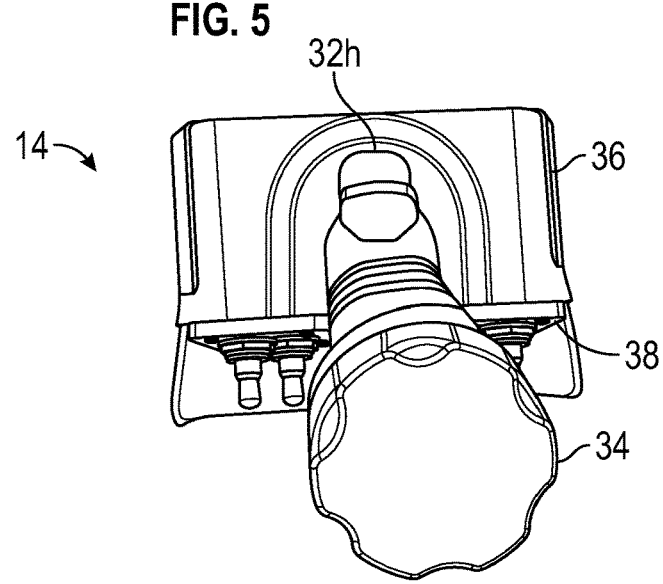
FIG. 6 is a bottom view of the remote control of FIG. 1, according to an exemplary embodiment.
Figure 7:
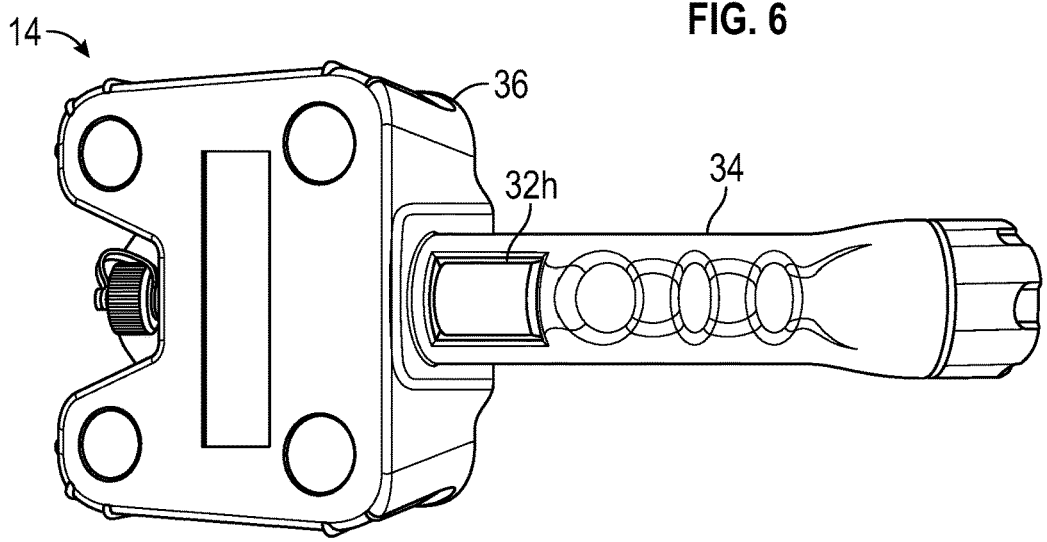
FIG. 7 is a rear view of the remote control of FIG. 1, according to an exemplary embodiment.
Figure 14:
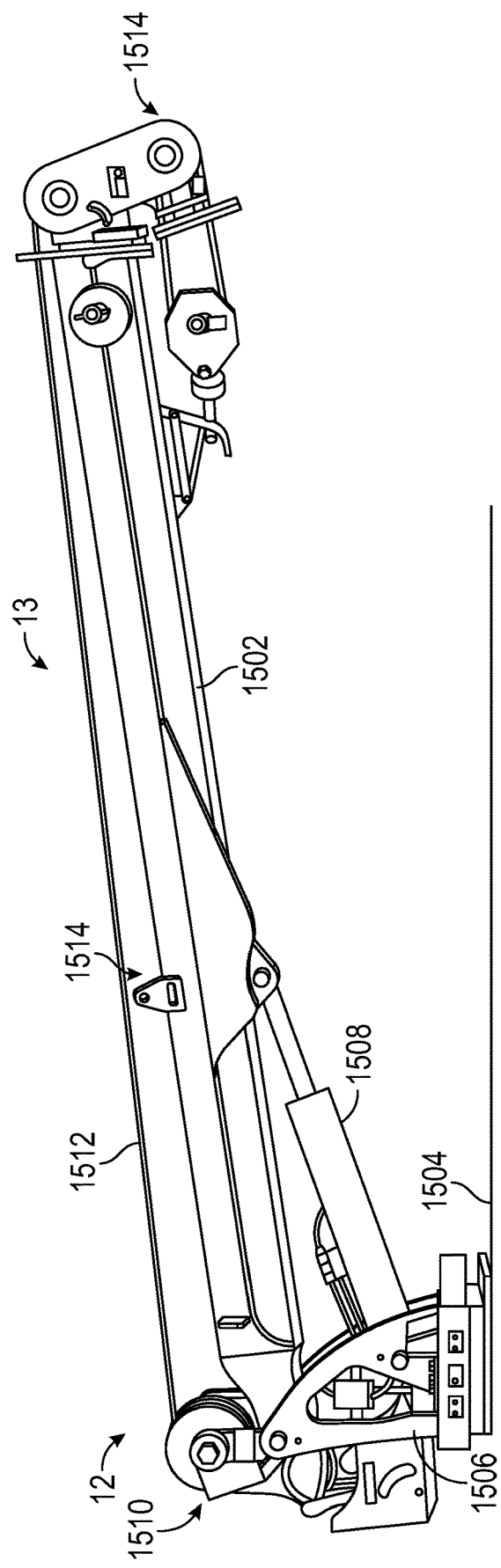
FIG. 14 is a side view of the crane of FIG. 1, according to an exemplary embodiment.

Referring particularly to FIGS. 1 and 14, a block diagram of a crane system 10 (e.g., a system, an operating system, a remote control system, a diagnostics system, a control system, a display system, etc.) includes a vehicle 12 and a remote control 14, according to an exemplary embodiment. The vehicle 12 can be a crane (e.g., a hydraulic crane vehicle) including one or more elongated members, booms, sections, telescoping members, etc., shown as crane 13 in FIG. 14. The vehicle 12 can also include a base 1506 with which the crane 13 is coupled. The vehicle 12 may be configured to secure with a ground surface and operate (e.g., through operation of one or more systems, sub-systems, electronic systems, hydraulic systems, pneumatic systems, etc.) to elevate (e.g., raise or lower) a distal end of the crane or a component that is secured with the distal end of the crane.

The vehicle 12 includes one or more controllable elements 16 (e.g., pistons, dampers, lights, winches, electric motors, hydraulic cylinders, pumps, compressors, actuators, systems, sub-systems, actuators 1508, winch assembly 1510, lights 1514, etc.), sensors 18 (e.g., pressure sensors, position sensors, temperature sensors, distance sensors, etc.), a user interface 20, and a controller 22. The vehicle 12 can also include a wireless transceiver 23 (e.g., a wireless radio, a cellular dongle, etc.). The user interface 20 can be or include a display screen and one or more input devices. The input devices can include any of, or any combination of, levers, buttons, joysticks, switches, etc. The display screen may be a touch-screen, a liquid crystal display (LCD) screen, a light emitting diode (LED) display screen, etc., or any other device configured to provide visual data to an operator or user of the vehicle 12. The controller 22 can be configured to operate the user interface 20 to display various data (e.g., operational data, sensor data, control data, etc.) on the user interface 20. In some embodiments, the controller 22 is configured to receive one or more user inputs from the user interface 20 (e.g., control inputs, lighting inputs, etc.). The controller 22 can also obtain sensor data from any of the sensors 18. The controller 22 may use any of the sensor data obtained from the sensors 18, user inputs obtained from the user interface 20, and/or control signals obtained from the remote control 14 to generate control signals for the controllable elements 16 of the vehicle 12 to operate the vehicle 12.

The remote control 14 includes a display screen 30, one or more input devices 32, a wireless transceiver 25, and processing circuitry 24 including a processor 26 and memory 28. The processing circuitry 24 can be communicably connected to the wireless transceiver 25 such that the processing circuitry 24 and the various components thereof can send and receive data via the wireless transceiver 25. The processor 26 can be implemented as a general purpose processor, an application specific integrated circuit (ASIC), one or more field programmable gate arrays (FPGAs), a group of processing components, or other suitable electronic processing components.

The memory 28 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. The memory 28 can be or include volatile memory or non-volatile memory. The memory 28 can include database components, object code components, script components, or any other type of information structure for supporting the various activities and information structures described in the present application. According to an example embodiment, the memory 28 is communicably connected to the processor 26 via the processing circuitry 24 and includes computer code for executing (e.g., by processing circuitry 24 and/or the processor 26) one or more processes described herein.

The processing circuitry 24 of the remote control 14 can be configured to operate the wireless transceiver 25 to establish wireless communication between the vehicle 12 and the remote control 14. Specifically, the wireless transceiver 25 may communicate wirelessly with the wireless transceiver 23. The remote control 14 and the vehicle 12 can communicate wirelessly using radio communications, Bluetooth, LoRa, Zigbee, cellular communications, etc., or any other wireless communications protocol.

The controller 22 of the vehicle 12 can be configured to operate the wireless transceiver 23 to communicate wirelessly with the wireless transceiver 25 of the remote control 14. The controller 22 can provide any of the sensor data obtained from the sensors 18, operational data, system data, etc., to the remote control 14 via the wireless communication between the wireless transceiver 23 and the wireless transceiver 25. In some embodiments, the remote control 14 is a portable or hand-held device that may be moved away from the vehicle 12 by an operator. The sensor data, operational data, system data, etc., is provided to the remote control 14 wirelessly as crane data. The crane data can include sensor data obtained from any sensors 18 of the vehicle 12, a current position or operating characteristic of any of the controllable elements 16 or systems of the vehicle 12, and/or information regarding the vehicle 12 (e.g., model data, crane rating, crane weight, maximum lift capacity, etc.). It should be understood that the controller 22 may represent any number of controllers of the vehicle 12, a body of the vehicle 12, a chassis of the vehicle 12, etc. For example the vehicle 12 may include two controllers 22 that are configured to communicate over a controller area network (CAN) bus of the vehicle 12 (e.g., a crane controller and a body controller). The remote control 14 can either wirelessly communicate with a base controller or control module of the vehicle 12 or may communicate over a cable tether connection. The base controller can communicate with the two controllers over the CAN bus. In some embodiments, the vehicle 12 does not include a body controller and includes a first user interface (e.g., the user interface 20) configured to receive control inputs for a crane apparatus of the vehicle 12 or systems or subs-systems thereof, and a second user interface configured to receive control inputs for the body of the vehicle 12.

Any of the crane data that is provided to the remote control 14 by the vehicle 12 can be displayed on the display screen 30 of the remote control. The remote control 14 is configured to receive user inputs (e.g., control or operational commands) from the operator through operation of the input devices 32 (e.g., pressing various buttons, selectable switches, etc.). The remote control 14 can provide the user inputs to the vehicle 12 (or more specifically, to the controller 22) via the wireless communications facilitated by the wireless transceiver 25 and the wireless transceiver 23. The vehicle 12 (or more specifically, the controller 22) can use the user inputs to adjust operation of any of the controllable elements 16, systems, sub-systems, etc., thereof (e.g., the controller 22 can use the user inputs wirelessly from the remote control 14 to generate control signals for the controllable elements 16). In some embodiments, the remote control 14 is configured to provide control inputs to the vehicle 12 and/or the body of the vehicle 12 (e.g., to control body functions or body systems of the vehicle 12). In some embodiments, the remote control 14 is configured to provide control inputs to the vehicle 12 and/or the body of the vehicle 12 for different models of the vehicle 12 or different models of the body of the vehicle 12. For example, the remote control 14 can store different programs, configurations, models, etc., for controlling different types of cranes 12 that have different bodies, different systems, different sub-systems, etc. In some embodiments, the remote control 14 is configured to establish communication with the controller 22 of the vehicle 12 to determine a type of the vehicle 12 (e.g., a model of the vehicle 12), or a type or model of the body of the vehicle 12 to determine proper control inputs for the vehicle 12 and/or the body of the vehicle 12. The remote control 14 can also provide control inputs for a chassis or a chassis system of the vehicle 12 (e.g., engine start, engine stop, etc.).

Referring still to FIG. 1, the remote control 14 can include a battery, an electrical energy storage device, a capacitor, etc., shown as energy storage 33. The energy storage 33 may be or include one or more battery cells (e.g., re-chargeable battery cells) configured to provide electrical energy for the various components of the remote control 14. For example, the energy storage 33 can provide electrical energy or power for any of the display screen, the input devices 32, lights, the processing circuitry 24, the wireless transceiver 25, etc., of the remote control 14.

Remote Control

Referring to FIGS. 2-7, the remote control 14 includes a handle 34, a panel 38 (e.g., a surface), and a shroud 36. The shroud 36, the handle 34, and the panel 38 can define a housing or shell structure, within which any of the processing circuitry 24, the processor 26, the memory 28, the energy storage 33, the wireless transceiver 25, etc., can be at least partially located. In some embodiments, any of the display screen 30, the input devices 32, etc., are fixedly coupled with the housing or shell structure so that the display screen 30, the input devices 32, etc., are accessible or operable from an exterior of the housing or shell structure by the operator.

Referring to FIGS. 2-7, the input devices 32 include a variety of buttons, toggle switches, and a trigger. Specifically, the input devices 32 include a stop button 32a, a first toggle switch 32b, a second toggle switch 32c, a third toggle switch 32d, a fourth toggle switch 32e, a fifth toggle switch 32f, a sixty toggle switch 32g, and a trigger 32h. The stop button 32a, the first toggle switch 32b, the second toggle switch 32c, the third toggle switch 32d, the fourth toggle switch 32e, the fifth toggle switch 32f, and the sixth toggle switch 32g are fixedly coupled or mounted on the panel 38. The display screen 30 is also fixedly coupled or mounted on the panel 38. The panel 38 is positioned on a first or front side of the remote control 14. The shroud 36 is configured to provide shade and/or protection for the display screen 30 and the various input devices 32 that are positioned on the panel 38. The shroud 36 can facilitate viewing of the display screen 30 even when sunlight is present (e.g., in an outdoor environment). The trigger 32h is positioned on a second or opposite side of the remote control 14 and may be positioned at an upper portion of the handle 34.

In some embodiments, operation of the stop button 32a (e.g., pressing the stop button 32a) causes the wireless transceiver 25 to send a stop signal to the vehicle 12 (e.g., to the controller 22 of the crane). When the vehicle 12 receives the stop signal from the remote control 14 (when the stop button 32a is pressed), operation of the vehicle 12 (e.g., operation of the various controllable elements 16, or of any currently operating system or sub-system of the vehicle 12) is ceased. For example, if the vehicle 12 is currently operating to raise, and the operator determines that such operation should be stopped, the operator may press the stop buttons 32a, thereby causing the vehicle 12 to stop the raising operation. The operator can press the stop button 32a even when the remote control 14 is positioned a distance from the vehicle 12.

Referring still to FIGS. 2-7, the remote control 14 can include a power icon 40, a horn icon 42, a screen icon 44, an engine speed icon 46, and a compressor icon 48, that are printed on, positioned on, painted on, etc., the panel 38. The icons 40-48 can indicate different fixed functions of the sixth toggle switch 32g and the first toggle switch 32b. For example, operating the sixth toggle switch 32g in an upwards direction may turn on or turn off the remote control 14. In some embodiments, the sixth toggle switch 32g can be operated by pushing the sixth toggle switch 32g into the upwards direction or into an upwards position, and holding the sixth toggle switch 32g in the upwards position for a predetermined amount of time (e.g., half a second). If the remote control 14 is currently on, holding the sixth toggle switch 32g in the upwards position for the predetermined amount of time shuts the remote control 14 off. If the remote control 14 is currently on, holding the sixth toggle switch 32g in the upwards position for the predetermined amount of time powers the remote control 14 on. In some embodiments, holding the sixth toggle switch 32g in the upwards position for a predetermined amount of time causes the remote control 14 to establish communications (e.g., wireless) with the controller 22 of the vehicle 12 (or a base wireless transceiver of the vehicle 12). The sixth toggle switch 32g can be held in the upwards position while an associated or connection process is performed.

The sixth toggle switch 32g can also be operated to flip through different user interfaces or screens that are displayed on the display screen 30. Momentarily transitioning the sixth toggle switch 32g into a downwards position may cause the display screen 30 to display a next control screen. When the remote control 14 is transitioned between different control screens, a functionality of any of the second toggle switch 32c, the third toggle switch 32d, the fourth toggle switch 32e, or the fourth toggle switch 32f may be adjusted so that the toggle switches 32c-32f are specific to a current control screen that is displayed on the display screen 30. However, the functionality or control resulting from operation of the first toggle switch 32b and the sixth toggle switch 32g may remain the same, regardless of a currently displayed control screen on the display screen 30.

Referring still to FIGS. 2-7, the sixth toggle switch 32g may be operated into the downwards position and held in the downwards position to cause the vehicle 12 to operate a horn (e.g., one of the controllable elements 16). When the sixth toggle switch 32g is held in the downwards position for a predetermined amount of time (e.g., an extended amount of time), the remote control 14 (e.g., the processing circuitry 24 and wireless transceiver 25) can provide a horn control signal to the vehicle 12. In some embodiments, holding the sixth toggle switch 32g in the downwards position for the predetermined amount of time activates a horn output on both a crane control module and a body control module of the vehicle 12. In some embodiments, a control output of the body control module activates a horn output of a chassis horn. The vehicle 12 (or more specifically, the controller 22) can use the horn control signal to activate a horn (e.g., one of the controllable elements 16) so that the horn operates until the sixth toggle switch 32g is released.

Referring still to FIGS. 2-7, the first toggle switch 32b can be operated to turn on or shut off a compressor of the vehicle 12 or to adjust an engine speed of the vehicle 12. Specifically, the first toggle switch 32b can be operated or transitioned or pressed into an upwards position to actuate or transition the compressor of the vehicle 12 (e.g., one of the controllable elements 16 of the vehicle 12) between an on-state and an off-state. If the compressor of the vehicle 12 is in the on-state, transitioning the first toggle switch 32b into the upwards position causes the compressor of the vehicle 12 to be transitioned into the off-state. Similarly, if the compressor of the vehicle 12 is in the off-position, transitioning the first toggle switch 32b into the upwards position causes the compressor of the vehicle 12 to be transitioned into the on-state. In some embodiments, the first toggle switch 32b can be operated to activate a compressor output on both the crane control module and the body control module. In some embodiments, only a body control compressor output is connected to enable compressor operation thereof.

Operation of the first toggle switch 32b into a downwards position adjusts a speed of a compressor of the vehicle 12 (e.g., one of the controllable elements 16 of the vehicle 12). For example, repeatedly transitioning the first toggle switch 32b into the downwards position may transition the speed of the compressor between different predetermined values or increase or decrease the speed of the compressor by a predetermined amount. Transitioning the first toggle switch 32b into the downwards position may control a chassis engine speed or an engine speed of an integrated power unit (IPU) of the vehicle 12. In some embodiments, the first toggle switch 32b can be transitioned into the downwards position to transition engine speed between two different predetermined speeds.

Figure 9:
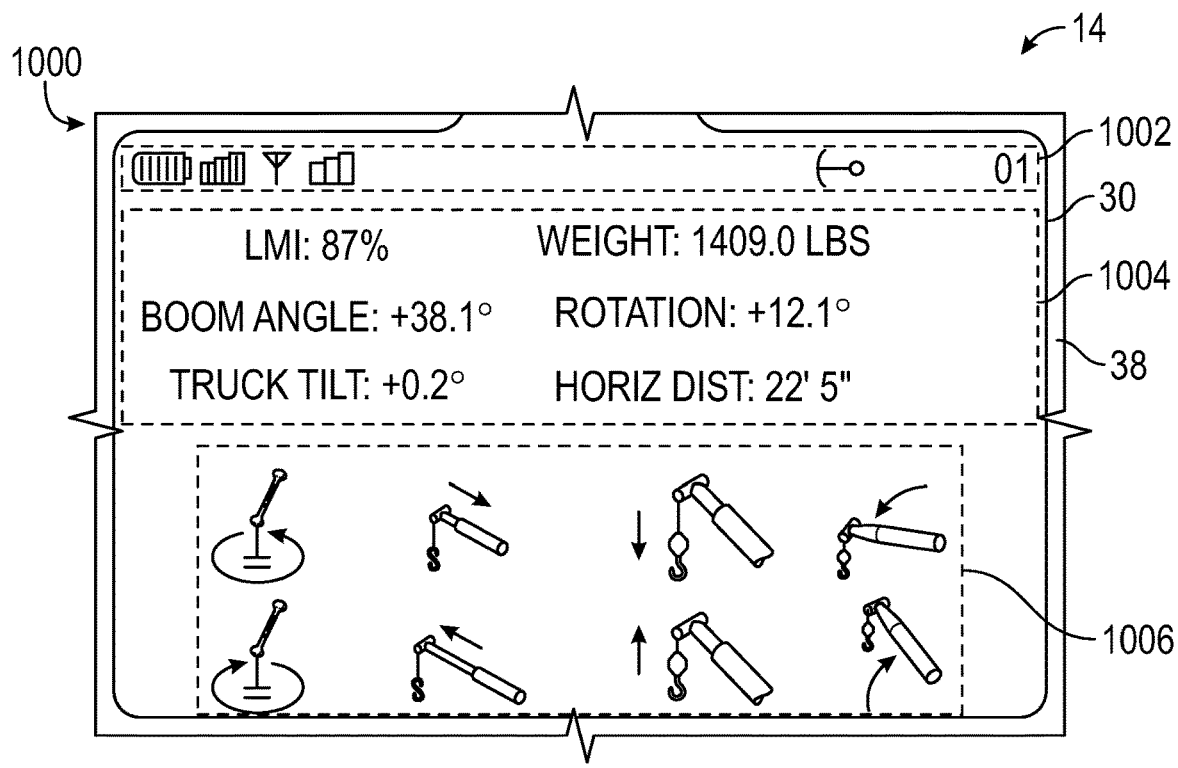
FIG. 9 is another graphical user interface that can be displayed on the remote control of FIG. 1, according to an exemplary embodiment.

Referring particularly to FIG. 9, a graphical user interface of a layout 1000 is shown. Any of the graphical user interfaces described herein may be arranged or displayed according to the layout 100 shown in FIG. 10. The layout 1000 includes a top bar 1002, one or more indicators 1004, and one or more toggle icons 1006. The top bar 1002 can display any of a battery level of the remote control 14 (e.g., a level of the energy storage 33), a network connectivity status of the remote control 14 (e.g., a network strength of a wireless network on which the wireless transceiver 25 operates), an indication of which graphical user interface or screen is shown, etc. In some embodiments, as the sixth toggle switch 32g is operated to transition between different graphical user interfaces or screens, the top bar 1002 may remain while displaying any updates to information or data displayed on the top bar 1002 (e.g., indicating which of multiple predetermined graphical user interfaces is currently displayed).

Figure 8:
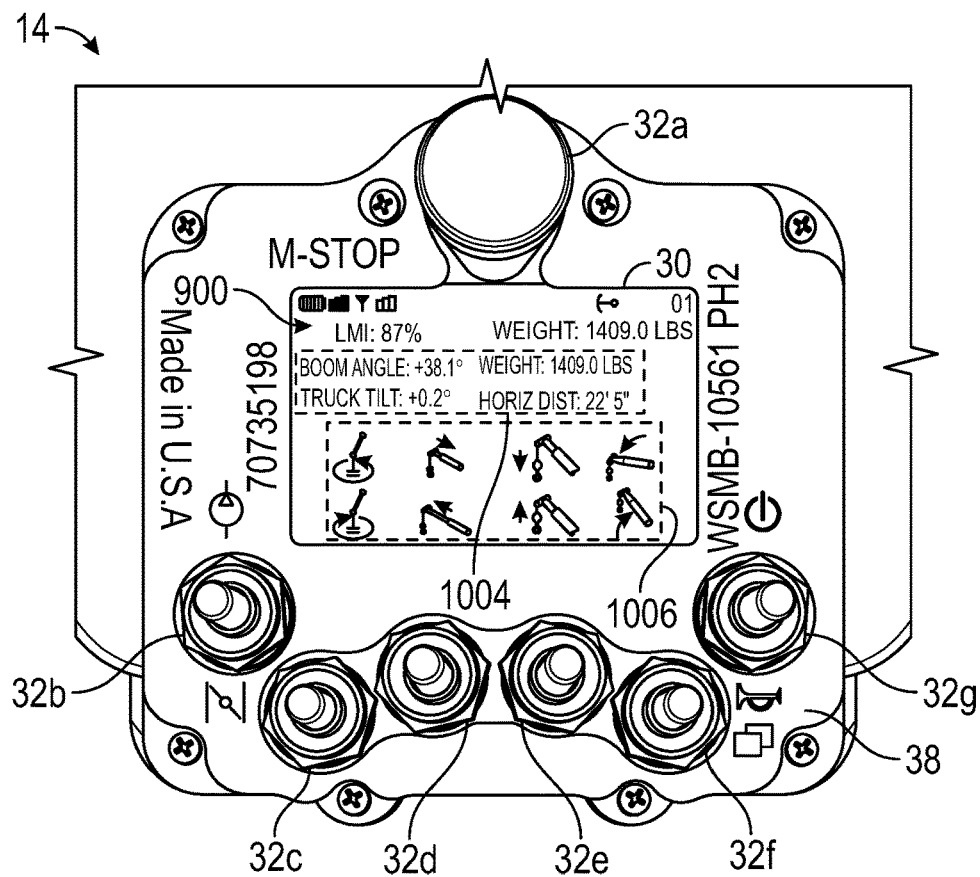
FIG. 8 is a front view of a display screen of the remote control of FIG. 1 displaying a graphical user interface, according to an exemplary embodiment.

Referring particularly to FIG. 8, a control graphical user interface 900 is shown displayed on the display screen 30, according to an exemplary embodiment. The control graphical user interface 900 can be associated with a particular functionality for each of the second toggle switch 32c, the third toggle switch 32d, the fourth toggle switch 32e, and the fourth toggle switch 32f. When the display screen 30 shows the control graphical user interface 900, the second toggle switch 32c may be configured to operate a rotation of the vehicle 12. For example, transitioning the second toggle switch 32c into an upwards position can cause the vehicle 12 to rotate in a first direction, whereas transitioning the toggle switch 32c into a downwards position can cause the vehicle 12 to rotate in a second direction. When the display screen 30 displays the control graphical user interface 900, the third toggle switch 32d can be configured to operate a boom of the vehicle 12 to telescope. For example, transitioning the third toggle switch 32d into an upwards position may cause the boom to extend, while transitioning the third toggle switch 32d into a downwards position may cause the boom to retract, or vice versa. The trigger 32h can be configured to control a speed of extension or retraction of the boom (or for movement of a crane apparatus thereof). For example, the operator may transition the third toggle switch 32d into the upwards position to select boom or crane extension, and press the trigger 32h to initiate boom or crane extension, with a degree that the trigger 32h is depressed controlling a speed of the boom or crane extension. Similarly, the operator may transition the third toggle switch 32d into the downwards position to select boom or crane retraction, and press the trigger 32h to initiate boom or crane retraction, with a degree that the trigger 32h is depressed controlling a speed of the boom or crane retraction.

When the display screen 30 displays the control graphical user interface 900, the fourth toggle switch 32e can be configured to operate or cause operation of a winch of the vehicle 12. Transitioning the fourth toggle switch 32e into an upwards position can cause the winch of the vehicle 12 to wind a cable, while transitioning the fourth toggle switch 32e into a downwards position can cause the winch of the vehicle 12 to unwind a cable, or vice versa. When the display screen 30 displays the control graphical user interface 900, the fifth toggle switch 32f can be configured to operate or cause operation of a boom lift of the vehicle 12. For example, transitioning the fifth toggle switch 32f into an upwards position may cause operation of the boom lift of the vehicle 12 to elevate, while transitioning the fifth toggle switch 32f into a downwards position may cause operation of the boom lift of the vehicle 12 to lower, or vice versa.

Referring still to FIG. 8, the control graphical user interface 900 is arranged according to the layout 1000. The toggle icons 1006 for the control graphical user interface 900 include a corresponding graphical depiction of operation of each of the second toggle switch 32c, the third toggle switch 32d, the fourth toggle switch 32e, and the fifth toggle switch 32f (e.g., icons or graphical depictions of each action associated with transitioning any of the toggle switches 32c-32f into the upwards position or the downwards position). The one or more indicators 1004 can provide information or data (e.g., crane data obtained from the vehicle 12, sensor data obtained from sensors 18 of the vehicle 12, etc.) relevant to different controllable elements 16 of the vehicle 12, systems, or sub-systems of the vehicle 12 associated with operations of the vehicle 12 that are performed in response to operation of the toggle switches 32c-32f. For example, the indicators 1004 can provide information related to the boom of the vehicle 12 (e.g., boom angle, rotation, etc.) and/or various other information related to the vehicle 12 such as load moment indicator (LMI), weight, tilt, etc.

Figure 10:
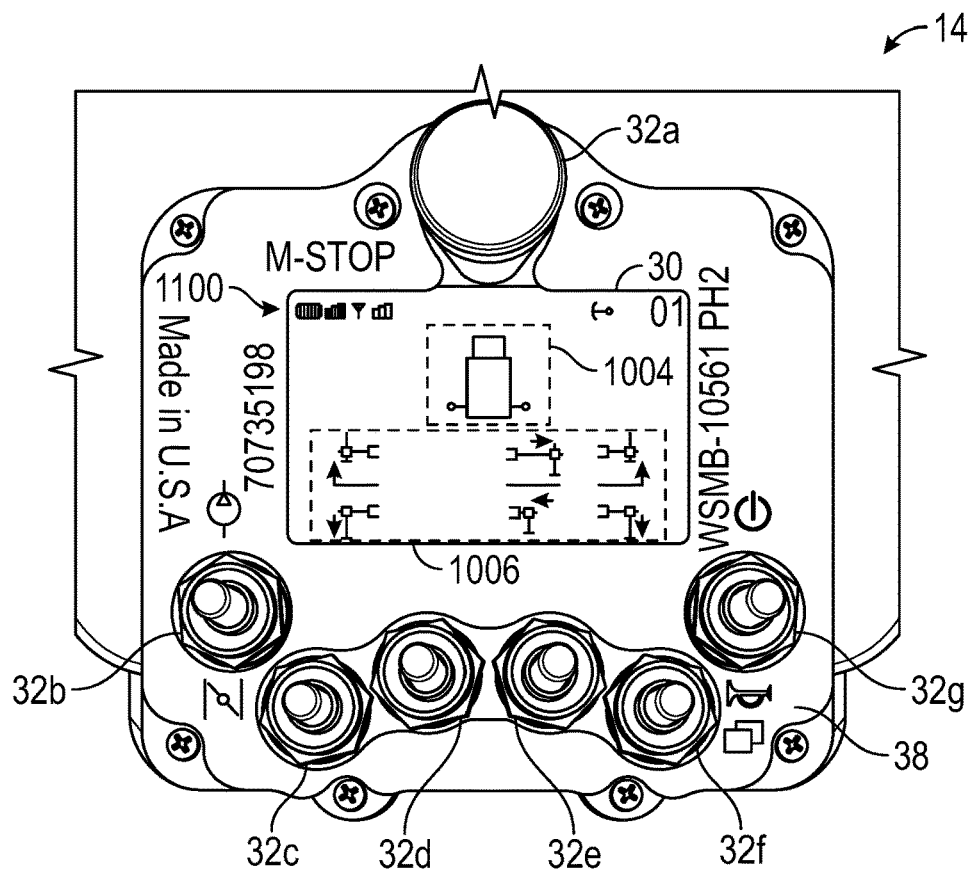
FIG. 10 is a front view of the display screen of the remote control of FIG. 1, displaying another graphical user interface, according to an exemplary embodiment.
Figure 11:
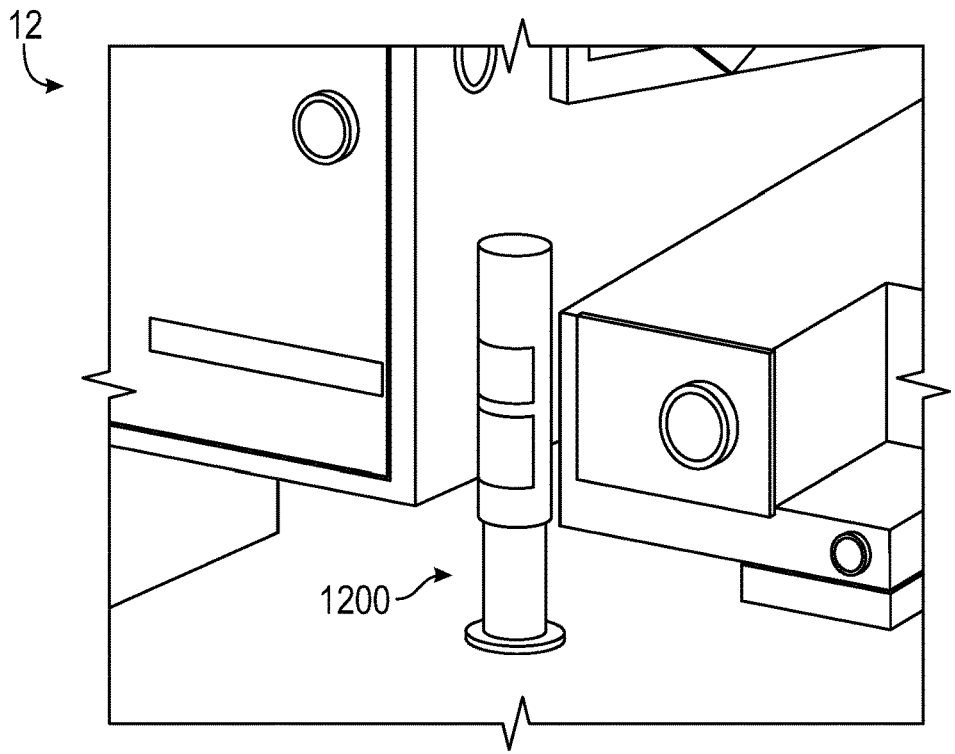
FIG. 11 is a perspective view of a stabilizer of a body of the crane of FIG. 1, according to an exemplary embodiment.

Referring now to FIGS. 10-11, a stabilizer control graphic user interface 1100 is shown displayed on the display screen 30, according to some embodiments. The control graphic user interface 1100 can be associated with stabilizer control of the vehicle 12, which can be operated through operation of the second toggle switch 32c, the third toggle switch 32d, the fourth toggle switch 32e, and the fifth toggle switch 32f. When the control graphic user interface 1100 is selected or displayed on the display screen 30 (e.g., by operation of the sixth toggle switch 32g as discussed above with reference to FIGS. 1-7), the second toggle switch 32c, the third toggle switch 32d, the fourth toggle switch 32e, and the fifth toggle switch 32f are configured to cause operation of various stabilizers 1200 (shown in FIG. 11) (e.g., controllable elements 16) of the vehicle 12. In some embodiments, the vehicle 12 includes multiple of the stabilizers 1200 that can be extend or retracted to adjust an orientation of the vehicle 12 relative to a ground surface (e.g., the ground surface 1504). The user or operator can provide a command to the controller 22 of the vehicle 12 via the input devices 32 of the remote control 14 to adjust an orientation of the vehicle 12 relative to the ground surface. The command may be a command to adjust the orientation of the vehicle 12 about at least one of a longitudinal or a lateral axis of the vehicle 12. The command may be a command to adjust the orientation of the vehicle 12 about any of the longitudinal or lateral axis by a desired or specific amount, a command to automatically operate the stabilizers 1200 of the vehicle 12 to achieve a desired or specific orientation of the vehicle 12, etc. The command may also be a continuous command so that the stabilizers 1200 of the vehicle 12 are operated to extend or retract as long as the input devices 32 (e.g., one of the toggle switches 32 or a joystick) is maintained by the operator in a specific position. The command can be transmitted to the controller 22 for use in operating the stabilizers 1200 (e.g., the controllable elements 16). The stabilizers 1200 can be telescoping members such as hydraulic actuators, linear electric actuators, etc., or any other member that can selectably extend or retract. In some embodiments, the command is provided at the remote control 14 to initiate an automatic leveling process. The automatic leveling process can be performed by the controller 22 at the vehicle 12 to achieve a level orientation of the vehicle 12 in response to the command. The display screen 30 can be configured to provide information regarding an orientation of the vehicle 12, operation of the stabilizers 1200, etc., as the stabilizers 1200 are operator. For example, the display screen 30 can provide a currently measured orientation of the vehicle 12 in real-time as the controller 22 operates the stabilizers 1200 to adjust the orientation of the vehicle 12.

When the display screen 30 shows the stabilizer control graphic user interface 1100, the second toggle switch 32c can be configured to cause operation of a left stabilizer of the vehicle 12. For example, transitioning the second toggle switch 32c into the upwards position may cause the left stabilizer of the vehicle 12 to retract or move towards an upward, tucked, or stowed position, while transitioning the second toggle switch 32c into the downward position may cause the left stabilizer of the vehicle 12 to extend or move towards a downwards or deployed position, or vice versa. In some embodiments, the left stabilizer of the vehicle 12 operates to extend or retract only while the second toggle switch 32c is maintained in the downwards or upwards position, or vice versa.

When the display screen 30 shows the stabilizer control graphic user interface 1100, the third toggle switch 32d can be configured to cause operation of a front stabilizer of the vehicle 12 or to perform automatic leveling operations of the vehicle 12. For example, transitioning the third toggle switch 32d into the upwards position may cause the front stabilizer of the vehicle 12 to deploy, while transitioning the third toggle switch 32d into the downwards position may cause performance of the automatic leveling operations (e.g., of the front stabilizer) of the vehicle 12.

When the display screen 30 shows the stabilizer control graphic user interface 1100, the fourth toggle switch 32e may be configured to cause operation of a right stabilizer of the vehicle 12. For example, transitioning the fourth toggle switch 32e into the upwards position may cause the right stabilizer to retract or translate inwards, while transitioning the fourth toggle switch 32e into the downwards position may cause the right stabilizer to extend or translate outwards, or vice versa.

When the display screen 30 shows the stabilizer control graphic user interface 1100, the fifth toggle switch 32f may be configured to cause operation of the right stabilizer. For example, transitioning the fifth toggle switch 32f into the upwards position may cause the right stabilizer of the vehicle 12 to retract or transition towards a stowed position, while transitioning the fifth toggle switch 32f into the downwards position may cause the right stabilizer of the vehicle 12 to extend or transition towards a deployed position, or vice versa. Referring particularly to FIG. 10, the stabilizer control graphic user interface 1100 is arranged according to the layout 1000. The indicators 1004 include a graphical representation of the vehicle 12 and various stabilizers thereof. The toggle icons 1006 include a corresponding graphical representation of the operations performed by the vehicle 12 (e.g., for the various stabilizers) in response to operation of any of the toggle switches 32c-32f.

Figure 12:
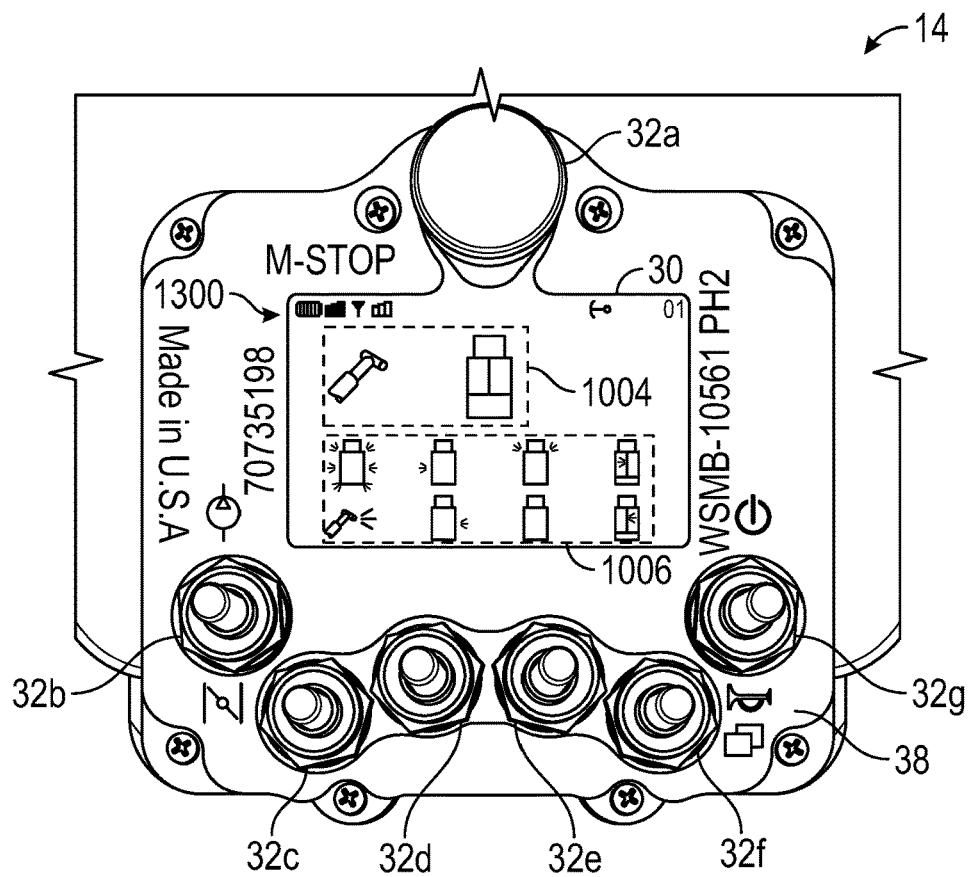
FIG. 12 is a front view of the display screen of the remote control of FIG. 1, displaying another graphical user interface, according to an exemplary embodiment.

Referring particularly to FIG. 12, a lighting control graphic user interface 1300 is shown displayed on the display screen 30, according to some embodiments. The lighting control graphic user interface 1300 can be associated with lighting control of the vehicle 12, which can be operated through operation of the second toggle switch 32c, the third toggle switch 32d, the fourth toggle switch 32e, and the fifth toggle switch 32f. When the lighting control graphic user interface 1300 is selected or displayed on the display screen 30 (e.g., by operation of the sixth toggle switch 32g as discussed above with reference to FIGS. 1-7), the second toggle switch 32c, the third toggle switch 32d, the fourth toggle switch 32e, and the fifth toggle switch 32f are configured to cause operation of various light devices, lights, lighting systems, lighting sub-systems, etc. (e.g., controllable elements 16) of the vehicle 12.

When the display screen 30 shows the lighting control graphic user interface 1300, the second toggle switch 32c is configured to cause operation of body lights and boom tip lights of the vehicle 12. For example, transitioning the second toggle switch 32c into the upwards position may cause the body lights to transition between an on-state and an off-state, while transitioning the second toggle switch 32c into the downward position may cause the boom tip lights of the vehicle 12 to transition between an on-state and or an off-state, or vice versa.

When the display screen 30 shows the lighting control graphic user interface 1300, the third toggle switch 32d is configured to cause operation of left and right flood lights of the vehicle 12. For example, transitioning the third toggle switch 32d into the upwards position may cause the left flood light of the vehicle 12 to transition between an on-state and an off-state, while transitioning the third toggle switch 32d into the downwards position may cause the right flood light to transition between an on-state and an off-state, or vice versa. The vehicle 12 may include two or three flood lights for each side. Transitioning the third toggle switch 32d between the upwards position and the downwards position can selectively activate or de-activate the flood lights of either side of the vehicle 12 (e.g., left and right sides). In some embodiments, transitioning the third toggle switch 32d between the upwards position and the downwards position can selectively activate or de-activate a subset of the left or right flood lights (e.g., only two of the three flood lights per side).

When the display screen 30 shows the lighting control graphic user interface 1300, the fourth toggle switch 32e is configured to cause operation of front and rear corner flood lights of the vehicle 12. For example, transitioning the fourth toggle switch 32e into the upwards position may cause the front corner flood light of the vehicle 12 to transition between an on-state and an off-state, while transitioning the fourth toggle switch 32*e* into the downwards position may cause the rear corner flood light to transition between an on-state and an off-state, or vice versa.

When the display screen 30 shows the lighting control graphic user interface 1300, the fifth toggle switch 32*f* is configured to cause operation of left and right compartment lights of the vehicle 12. For example, transitioning the fifth toggle switch 32*f* into the upwards position may cause the left compartment light of the vehicle 12 to transition between an on-state and an off-state, while transitioning the fifth toggle switch 32*f* into the downwards position may cause the right compartment light to transition between an on-state and an off-state, or vice versa.

Referring still to FIG. 12, the lighting control graphical user interface 1300 is arranged according to the layout 1000. The toggle icons 1006 for the lighting control graphical user interface 1300 include a corresponding graphical depiction of operation of each of the second toggle switch 32*c*, the third toggle switch 32*d*, the fourth toggle switch 32*e*, and the fifth toggle switch 32*f* (e.g., icons or graphical depictions of each action associated with transitioning any of the toggle switches 32*c*-32*f* into the upwards position or the downwards position). The one or more indicators 1004 include graphical representations of the boom of the vehicle 12 and a body of the vehicle 12, and can illustrate which lights or lighting systems are currently activated (e.g., in the on-state).

Figure 13:
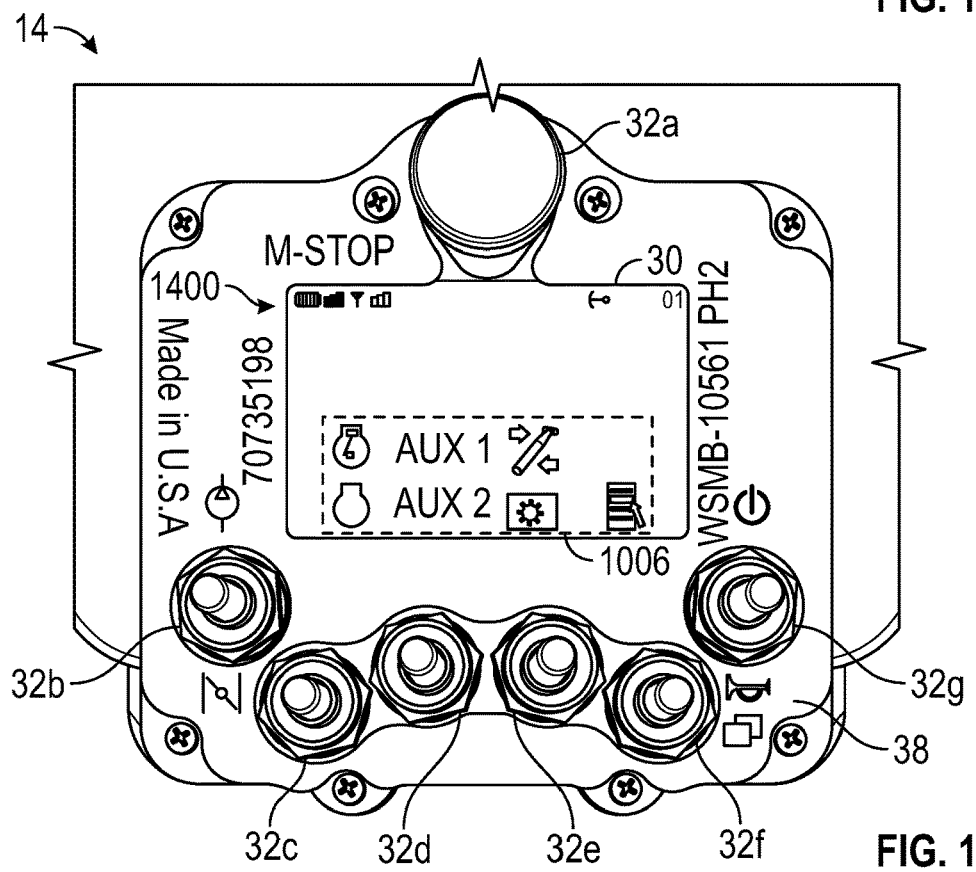
FIG. 13 is a front view of the display screen of the remote control of FIG. 1, displaying another graphical user interface, according to an exemplary embodiment.

Referring particularly to FIG. 13, an operations control graphic user interface 1400 is shown displayed on the display screen 30, according to some embodiments. The operations control graphic user interface 1400 can be associated with operations control of the vehicle 12, which can be operated through operation of the second toggle switch 32*c*, the third toggle switch 32*d*, the fourth toggle switch 32*e*, and the fifth toggle switch 32*f*. When the operations control graphic user interface 1400 is selected or displayed on the display screen 30 (e.g., by operation of the sixth toggle switch 32*g* as discussed above with reference to FIGS. 1-7), the second toggle switch 32*c*, the third toggle switch 32*d*, the fourth toggle switch 32*e*, and the fifth toggle switch 32*f* are configured to cause operations of various systems, components, etc. (e.g., controllable elements 16) of the vehicle 12.

When the display screen 30 shows the operations control graphic user interface 1400, the second toggle switch 32*c* is configured to cause operation of an engine of the vehicle 12 (e.g., the chassis engine or the IPU of the vehicle 12). For example, transitioning the second toggle switch 32*c* into the upwards position may cause the engine to transition into an on-state (e.g., start the engine), while transitioning the second toggle switch 32*c* into the downward position may cause the engine of the vehicle 12 to transition into an off-state (e.g. shut off the engine), or vice versa.

When the display screen 30 shows the operations control graphic user interface 1400, the third toggle switch 32*d* is configured to activate or deactivate an auxiliary power of the vehicle 12. For example, transitioning the third toggle switch 32*d* into the upwards position may activate a first auxiliary power the vehicle 12, while transitioning the third toggle switch 32*d* into the downwards position may activate a second auxiliary of the vehicle 12, or vice versa.

When the display screen 30 shows the operations control graphic user interface 1400, the fourth toggle switch 32*e* is configured to cause operation of the boom or a power take off (PTO) of the vehicle 12. For example, transitioning the fourth toggle switch 32*e* into the upwards position may cause the boom of the vehicle 12 to transition into a stowed position, while transitioning the fourth toggle switch 32*e* into the downwards position may cause the PTO to transition between an on-state and an off-state, or vice versa.

When the display screen 30 shows the operations control graphic user interface 1400, the fifth toggle switch 32*f* is configured to cause the display screen 30 to provide different sub-menus. The sub-menus may include a diagnostic sub-menu (and corresponding screen), a sensor calibration sub-menu, an operator settings sub-menu, and a system configuration sub-menu. In some embodiments, the diagnostics sub-menu allows the operator to initiate system diagnostics using the remote control 14. CAN diagnostic codes can have both an identification (ID) number and an explanation or summary provided in clear text which are displayed on the display screen 30. In some embodiments, diagnostics data is provided on the display screen 30 in the form of text rather than numeric codes. In some embodiments, the sensor calibration sub-menu allows the operator to initiate sensor calibration of the sensors 18 using the remote control 14. In some embodiments, the operator setting sub-menu allows the operator to change different settings of the vehicle 12 using the remote control 14. In some embodiments, the system configuration sub-menu allows the operator to initiate system configuration of the vehicle 12 using the remote control 14.

Referring still to FIG. 13, the operations control graphical user interface 1400 is arranged according to the layout 1000. The toggle icons 1006 for the lighting control graphical user interface 1300 include a corresponding graphical depiction of operation of each of the second toggle switch 32*c*, the third toggle switch 32*d*, the fourth toggle switch 32*e*, and the fifth toggle switch 32*f* (e.g., icons or graphical depictions of each action associated with transitioning any of the toggle switches 32*c*-32*f* into the upwards position or the downwards position).

Operation of any of the toggle switches 32*b*-32*g* as described herein causes a generation of a signal that is provided to the processing circuitry 24. In some embodiments, the first toggle switch 32*b* and the sixth toggle switch 32*g* have fixed functionality that does not change as the screens displayed on the display screen 30 are switched (e.g., through operation of the sixth toggle switch 32*g*). In some embodiments, the functionality of the second toggle switch 32*c*, the third toggle switch 32*d*, the fourth toggle switch 32*e*, and the fifth toggle switch 32*f* is changed as the screen displayed on the display screen 30 changes. The signal provided to the processing circuitry 24 can be used in combination with an indication or selection of the screen displayed on the display screen 30 to determine appropriate control signals to provide to the vehicle 12 for operation of corresponding controllable elements 16 of the vehicle 12.

Referring particularly to FIG. 14, the vehicle 12 is shown in greater detail, according to an exemplary embodiment. The vehicle 12 is configured to be supported on a ground surface 1504 and can include a base 1506 (e.g., a body). The base 1506 may include a turntable or a rotatable section. The vehicle 12 also includes a boom 1502 that is pivotally coupled with the base 1506. The boom 1502 may be a telescoping boom including different sections that extend and retract relative to each other. The vehicle 12 can also include one or more actuators 1508 configured to drive the boom 1502 to pivot relative to the base 1506 and/or to drive the boom 1502 to telescope. The vehicle 12 also includes a winch assembly 1510 including a cable or tensile member 1512 that can be wound or released to drive the winch assembly 1510. The vehicle 12 can also include one or more lights 1514.

Advantageously, the system described herein provides the capability of performing various operator functions using a handheld radio remote (e.g., the remote control 14). This allows the operator to avoid numerous trips back to the vehicle 12 to perform tasks such as deploying stabilizers and/or activating work lights. The handheld radio remote can be configured to provide multiple screen selections, with different sub-screens. Each screen may reconfigure various input devices of the handheld radio remote.

Configuration of Exemplary Embodiments

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, and/or illustrations of possible embodiments (and such terms are not intended to connote that such embodiments are necessarily extraordinary or superlative examples).

The term "coupled," as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. Such members may be coupled mechanically, electrically, and/or fluidly.

The term "or," as used herein, is used in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is understood to convey that an element may be either X, Y, Z; X and Y; X and Z; Y and Z; or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit and/or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the vehicle as shown in the various exemplary embodiments is illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. Other substitutions, modifications, changes, and omissions may be made in the design, operating conditions and arrangement of the exemplary embodiments without departing from the scope of the present disclosure.

What is claimed is:

1. A handheld remote control for a crane, the remote control comprising:
    a wireless transceiver configured to wirelessly communicate with a controller of the crane;
    an input device configured to receive a user input;
    a display screen configured to display information regarding deployment of a stabilizer of the crane;
    a stop button; and
    processing circuitry configured to:
        obtain the user input via the input device, the user input being a command to initiate an automatic leveling operation;
        cause a plurality of stabilizers of the crane to deploy or retract to perform the automatic leveling operation responsive to the user input; and
        cease operation of the plurality of stabilizers performing the automatic leveling operation responsive to depression of the stop button.

2. The handheld remote control of claim 1, wherein the display screen is configured to visually indicate an operation that is performed at the crane in response to the input device being operated by a user.

3. The handheld remote control of claim 1, wherein a functionality of the input device depends on a selected user interface for the display screen out of a plurality of different user interfaces.

4. The handheld remote control of claim 1, wherein the input device is a first input device and the handheld remote control further includes a second input device, wherein providing a user input at the second input device causes a corresponding function to be performed at the crane, wherein the corresponding function comprises any of a lighting function, a stabilizer deployment or retraction function, an engine function, a power take off (PTO) function, a compressor function, or a crane function.

5. The handheld remote control of claim 1, wherein the processing circuitry is configured to wirelessly transmit a stop signal to the controller of the crane using the wireless transceiver in response to the stop button being pressed.

6. The handheld remote control of claim 1, wherein the processing circuitry is configured to obtain crane data from the crane through the wireless transceiver and operate the display to provide the crane data to a user.

7. The handheld remote of claim 1, wherein the handheld remote control comprises a handle, a panel upon which the input device and the display screen are disposed, and a shroud that at least partially surrounds the panel.

8. The handheld remote of claim 1, wherein the user input further comprises a command to adjust a speed of a compressor, wherein the processing circuitry is configured to use the command to adjust the speed of the compressor to operate the compressor to increase or decrease in speed according to the command.

9. The handheld remote of claim 1, wherein the user input further comprises a command to activate or deactivate a power take off (PTO) of the crane, wherein the processing circuitry is configured to use the command to activate or deactivate the PTO of the crane to shut off or turn on the PTO of the crane.

10. The handheld remote of claim 1, wherein the input device comprises six toggle switches, wherein a first toggle switch and a second toggle switch of the six toggle switches have fixed functionality that does not change as a screen displayed by the display screen is changed, and wherein a third toggle switch, a fourth toggle switch, a fifth toggle switch, and a sixth toggle switch of the six toggle switches have functionality that changes as the screen displayed by the display screen is changed.

11. A control system for a crane, the control system comprising:
    a controller configured to operate a plurality of stabilizers and an actuator of the crane;
    a remote control comprising at least one joystick configured to receive a user input, the remote control configured to:
        wirelessly communicate with the controller to transmit the user input to the controller, wherein the user input comprises a command to perform an automatic leveling operation of the crane;
        responsive to depression of a stop button of the remote control, transmitting a stop signal to the controller to stop operation of a plurality of stabilizers of the crane;
    wherein the controller is configured to use the user input to operate the plurality of stabilizers of the crane to automatically adjust an orientation of the crane to level the crane on a ground surface.

12. The control system of claim 11, wherein the remote control comprises a display screen that is configured to visually indicate an operation performed at the crane in response to the at least one joystick being operated by the user.

13. The control system of claim 12, wherein the controller is configured to transmit sensor data of an orientation of the crane to the remote control, wherein the display screen is configured to display the orientation of the crane to the user as the controller operates the stabilizer to adjust the orientation of the crane in response to operation of the at least one joystick.

14. The control system of claim 12, wherein the user input is a command to automatically operate the stabilizer to achieve a target orientation of the crane, wherein the controller is configured to operate the stabilizer to achieve the target orientation and the display screen of the remote control is configured to display the orientation of the crane to the user as the controller operates the stabilizer.

15. The control system of claim 11, wherein a functionality of the remote control depends on a selected user interface for the display screen out of a plurality of different user interfaces.

16. The control system of claim 11, wherein operation of the at least one joystick causes a corresponding function to be performed at the crane, wherein the corresponding function comprises any of a lighting function, a stabilizer deployment or retraction function, an engine function, a power take off (PTO) function, a compressor function, or a crane function.

17. The control system of claim 11, wherein the remote control is configured to wirelessly transmit a stop signal to the controller of the crane in response to the stop button being pressed, wherein the controller is configured to limit further operation of the crane in response to the stop signal.

18. A method for remotely adjusting an orientation of a crane, the method comprising:
obtaining a user input to perform an automatic adjustment to an orientation of the crane at a remote control, the remote control configured to wirelessly communicate with a controller on the crane and configured to be held in an operator's hand;
operating a stabilizer of the crane with the controller on the crane in response to the user input to perform the automatic adjustment to the orientation of the crane;
displaying data related to the orientation of the crane on a display screen of the remote control as the controller on the crane operates the stabilizer of the crane to adjust the orientation of the crane; and
ceasing operation of the stabilizer of the crane that is performing the automatic adjustment of the orientation of the crane responsive to depression of a stop button on the remote control.

19. The method of claim 18, wherein the controller on the crane is configured to transmit sensor data of the orientation of the crane to the remote control, wherein the display screen is configured to display the orientation of the crane to the operator as the controller operates the stabilizer to adjust the orientation of the crane in response to operation of at least one joystick of the remote control.

20. The method of claim 18, wherein the controller is configured to automatically operate a plurality of stabilizers of the crane to perform the automatic adjustment to the orientation of the crane.

* * * * *